(12) United States Patent
Loudot et al.

(10) Patent No.: US 8,847,555 B2
(45) Date of Patent: Sep. 30, 2014

(54) FAST CHARGING DEVICE FOR AN ELECTRIC VEHICLE

(75) Inventors: Serge Loudot, Villiers-le-Bacle (FR);
Benoit Briane, Guyancourt (FR);
Olivier Ploix, Jouars-Pontchartrain (FR);
Arnaud Villeneuve, Vernouillet (FR)

(73) Assignee: Renault S.A.S., Guyancourt (FR)

( * ) Notice: Subject to any disclaimer, the term of this patent is extended or adjusted under 35 U.S.C. 154(b) by 294 days.

(21) Appl. No.: 12/919,396

(22) PCT Filed: Mar. 11, 2010

(86) PCT No.: PCT/EP2010/053078
§ 371 (c)(1),
(2), (4) Date: Jan. 24, 2011

(87) PCT Pub. No.: WO2010/103063
PCT Pub. Date: Sep. 16, 2010

(65) Prior Publication Data
US 2012/0286740 A1 Nov. 15, 2012

(30) Foreign Application Priority Data
Mar. 11, 2009 (FR) .................................... 09 51529

(51) Int. Cl.
*H02J 7/00* (2006.01)
*H02J 7/04* (2006.01)
*H02M 7/217* (2006.01)
*B60L 11/18* (2006.01)
*H02M 3/158* (2006.01)

(52) U.S. Cl.
CPC ............. *H02J 7/045* (2013.01); *Y02T 10/642* (2013.01); *Y02T 90/14* (2013.01); *Y02T 10/7088* (2013.01); *Y02T 90/127* (2013.01); *H02M 3/1584* (2013.01); *B60L 2220/54* (2013.01); *Y02T 10/7005* (2013.01); *H02M 7/217* (2013.01); *B60L 11/1814* (2013.01); *Y02T 10/641* (2013.01); *H02P 2209/01* (2013.01)
USPC .......................................... 320/137; 363/132

(58) Field of Classification Search
USPC ............................................ 320/137; 318/503
See application file for complete search history.

(56) References Cited

U.S. PATENT DOCUMENTS 4,920,475 A * 4/1990 Rippel ........................... 363/132
5,341,075 A * 8/1994 Cocconi ........................ 318/139

(Continued)

FOREIGN PATENT DOCUMENTS

EP 0 603 778 6/1994
EP 0 834 977 4/1998

(Continued)

OTHER PUBLICATIONS

U.S. Appl. No. 13/132,727, filed Jun. 3, 2011, Briane, et al.

(Continued)

*Primary Examiner* — Samuel Berhanu
*Assistant Examiner* — Jerry D Robbins
(74) *Attorney, Agent, or Firm* — Oblon, Spivak, McClelland, Maier & Neustadt, L.L.P.

(57) ABSTRACT

A device for charging a battery including a rectifier input stage configured to be connected to a power supply network and an inverter output stage configured to be connected to the battery, and a mechanism regulating average current obtained from the input stage about a current value generated from the maximum current supplied by the power supply network and according to a coefficient that is at least equal to a ratio between the maximum voltage rectified by the input stage and the battery voltage.

14 Claims, 7 Drawing Sheets

(56) References Cited

U.S. PATENT DOCUMENTS

| | | | |
|---|---|---|---|
| 5,412,557 A * | 5/1995 | Lauw | 363/37 |
| 5,500,579 A * | 3/1996 | Kim et al. | 318/493 |
| 5,504,414 A * | 4/1996 | Kinoshita | 180/65.8 |
| 5,629,603 A | 5/1997 | Kinoshita | |
| 6,031,738 A * | 2/2000 | Lipo et al. | 363/37 |
| 6,804,127 B2 * | 10/2004 | Zhou | 363/37 |
| 7,012,822 B2 * | 3/2006 | Zhu et al. | 363/70 |

FOREIGN PATENT DOCUMENTS

| | | |
|---|---|---|
| JP | 3729617 | 10/2005 |
| WO | 93 01650 | 1/1993 |
| WO | WO 2010/089071 A1 | 8/2010 |
| WO | WO 2011/157922 A1 | 12/2011 |
| WO | WO 2012/032241 A2 | 3/2012 |

OTHER PUBLICATIONS

International Search Report issued Jun. 24, 2010 in PCT/EP10/53078 filed Mar. 11, 2010.

U.S. Appl. No. 12/866,997, filed Aug. 10, 2010, Briane, et al.

U.S. Appl. No. 14/111,925, filed Oct. 15, 2013, Gati, et al.

* cited by examiner

FAST CHARGING DEVICE FOR AN ELECTRIC VEHICLE

The invention relates to the charging of a battery of an electric vehicle, and more particularly a charging device, incorporated in the vehicle, making it possible to recharge the battery directly from a single-phase or three-phase power supply network.

One of the major drawbacks of electric vehicles relates to their availability. In practice, when its battery is discharged, the electric vehicle remains unavailable throughout the recharging time, which can extend to several hours.

In order to reduce the battery recharging time, it is known to increase the charging power by increasing the current taken from the network. It has also been proposed to take this current from a three-phase network rather than a single-phase network, the charging power being greater when the current is taken from a three-phase power supply network.

The document JP 08 308 255 describes a device making it possible to charge a battery directly from a single-phase network. This device allows for recharging without the use of a contactor. It is therefore produced using few components. For example, two diodes and an inductance can be used.

However, the inductance that is passed through by the power supply network current may become significant for higher charging powers. It is then necessary to use an inductance with increased capacities. Now, for a given technology, the volume of the inductance increases when its value increases. The use of this type of device consequently involves a certain number of major drawbacks, notably because of the fact that it has a larger footprint for high charging powers. Furthermore, when the device operates on a single-phase network, the voltage from the battery to be charged must be greater than that of the rectified network.

The Japanese document 2002/293 499 describes an incorporated three-phase charger. However, a contactor is still necessary to switch from the traction mode to the recharging mode for the electric vehicle's battery. This charger also uses a diode rectifier for the three-phase network which produces a quantity of current harmonics that are situated outside the limits set by most electrical energy distributors.

The aim of the invention is therefore to resolve the above-mentioned drawbacks, and in particular to propose an incorporated charging device making it possible to charge a motor vehicle battery directly from a single-phase or three-phase network, and do so without using any contactor.

The subject of the invention is therefore, according to a first aspect, a device for charging a battery comprising a rectifier input stage designed to be connected to a power supply network and an inverter output stage designed to be connected to the battery.

This device comprises means of regulating the average current obtained from the input stage to a current value calculated according to the maximum current supplied by the power supply network and according to a coefficient that is greater than a ratio between the maximum voltage to be rectified by the input stage and the battery voltage.

Preferably, the device comprises connection means able to directly connect the rectifier input stage to a three-phase power supply network or to a single-phase power supply network.

It is also possible to connect the rectifier input stage to an alternating or direct current single-phase power supply network.

The input stage advantageously comprises at least one free wheeling diode.

The free wheeling diode, while it can be functionally eliminated to the benefit of a short-circuit of an arm of the input stage, offers the benefit of reducing the dissipation losses. In practice, the dissipation in a diode is much less than when the current has to circulate in two diodes and two transistors in series. It also offers a benefit at the operating safety level in the event of any drift or loss of control. In practice, the procedure is limited to ordering a blocking of all the transistors and the current from the stator coils can then continue to circulate through this diode.

The device can advantageously comprise first means of controlling the input stage and second means of controlling the output stage able to control the output stage, the first means of controlling the rectifier input stage being independent of the second means of controlling the inverter output stage.

The first control means advantageously comprise means for controlling the duty cycle of a switching control signal for the input stage or a regulation loop.

For example, the duty cycle according to which the rectifier input stage can be controlled corresponds to the transistor activation duty cycle.

The device for charging a battery is designed to be mounted in a motor vehicle comprising at least one electric traction device, i.e. a device comprising at least an electric motor and an inverter. The inverter output stage of the device for charging a battery can advantageously be formed by an inverter stage of the vehicle's traction system.

In this way, the charging device is thus incorporated entirely in the vehicle and does not require the use of an additional inverter output stage, given that the inverter stage already present in the vehicle is used. Thus, it is possible to design cheaply the charge spots of the infrastructure, the charge spots being merely output plugs of the power supply network. Further, the cost of the infrastructure network is reduced, resulting in the possibility to increase the spreading of the charge spots, to provide a better coverage for the vehicle users.

Advantageously, the device can comprise filtering means incorporated in the vehicle able to filter the current from the power supply network taken by the device.

The current taken from the three-phase power supply network can essentially be filtered by input capacitors, and by an electromagnetic compatibility (EMC) filter so that this current satisfies the harmonic mask of the network connection constraints.

Also, the inductance of the stator coils of the electric vehicle can be used as an energy buffer filter. In practice, when the charging power is high, the occupied volume and the weight of such an inductance and/or capacitive filter would become prohibitive for mounting on board a motor vehicle. For example, the weight of an inductance and/or capacitive filter can amount to about 30 kilograms and would occupy a volume of about 20 liters in the vehicle, for a 63 A (63 amp) device for charging batteries on a 400 V three phase network and for battery voltages in the range of 250 to 400 V.

According to another aspect, there is proposed, in one implementation, a battery charging method.

This method comprises a regulation of the average current obtained from a rectifier input stage about a current value generated from the maximum current supplied by a power supply network, and according to a coefficient that is at least equal to a ratio between the maximum voltage rectified by a rectifier input stage and a battery voltage.

Advantageously, the input stage is directly connected to a three-phase power supply network or to a single-phase power supply network.

In other words, the input stage is connected to a three-phase or single-phase power supply network, without the use of any contactor. It is thus possible to ensure operation in charging and traction modes without having to use contactors to switch from one configuration to the other.

Moreover, the input stage can be directly connected to a direct current single-phase power supply network.

The current from the inverter output stage is advantageously allowed to circulate in at least one free wheeling diode.

Thus, the current output by the stator coils can continue to circulate in the free wheeling diodes.

Preferably, the rectifier input stage is controlled by control of the duty cycle of a switching control signal for the input stage or by means of a regulation loop, the control of the rectifier input stage being independent of the control of the inverter output stage.

The current absorbed from the power supply network can then be controlled by duty cycles, that is to say current durations, pulses that will be applied by the control of the transistors of the rectifier input stage.

The method also comprises a filtering of the current from the power supply network absorbed by the device using incorporated filtering means.

Other benefits and features of the invention will become apparent from reading the detailed description of one embodiment of the invention, which is by no means limiting, and studying the appended drawings, in which.

Figure 1:
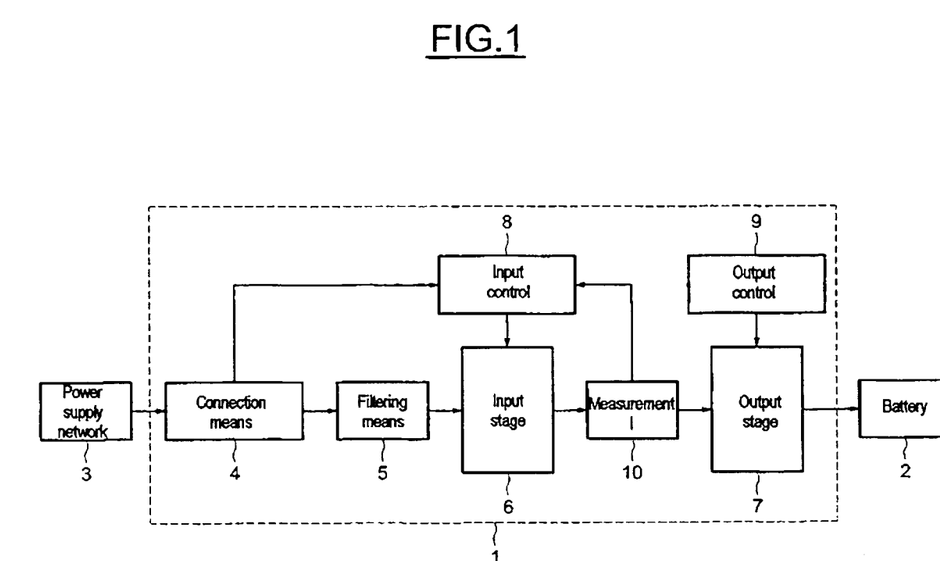
FIG. 1 diagrammatically represents a battery charging device according to one embodiment.

FIG. 1 diagrammatically represents a device 1 for charging a battery 2 of a vehicle with electric traction system, powered by a power supply network 3.

This charging device 1 is an incorporated device, that is to say mounted on board the vehicle. It is designed to handle the charging of the battery in order to supply the energy necessary for propulsion. It is also designed to ensure the charging of the battery either from a single-phase power supply network, or from a three-phase power supply network.

The charging device 1 comprises connection means 4 making it possible to connect the charging device 1 to the power supply network 3. For example, a suitable connection means could be a 63A PK series industrial plug commercially available by Schneider-Electric. Other similar plugs could also be suitable. It also comprises filtering means 5 making it possible to filter the current from the power supply network taken by the device 1.

The device moreover comprises a rectifier input stage 6 coupled to the output of the filtering means 5 and making it possible to rectify the alternating current obtained from the power supply network 3, and an inverter output stage 7 connected to the battery 2. The input stage 6 and the output stage 7 are controlled by first and second respective control means 8 and 9.

In a first embodiment, the input stage 6 and the output stage 7 can be controlled by first and second respective control means 8 and 9 in a dependent way. This is achieved by synchronising the drive voltage of transistors 12 of the input stage 6 with the drive voltage of transistors 16 of the output stage 7.

In a second embodiment, the first and second control means 8 and 9 can be controlled independently. Thus, the input stage 6 and the output stage 7 can each be controlled independently by their own respective control means 8 and 9.

Figure 3A:
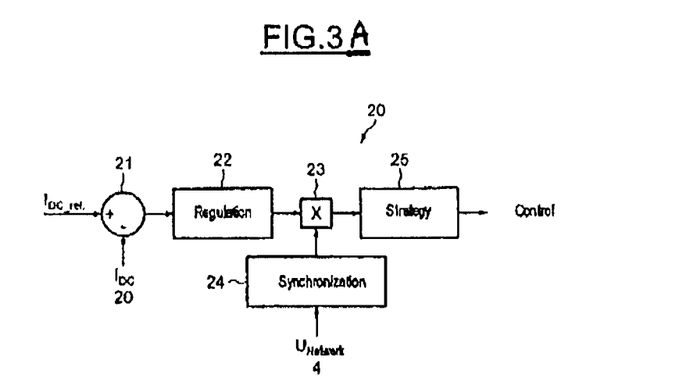
FIG. 3A presents an exemplary regulation means.

The first control means 8 is preferably the type of the regulation means shown on FIG. 3A. The second control means 9 can be of the type of the regulation means shown on FIG. 3B. Both types of regulation means will be described later throughout the description.

The first control means 8 of the input stage 6 receive as input a signal obtained from a module 10 for measuring the output current of the input stage 6.

Figure 2:
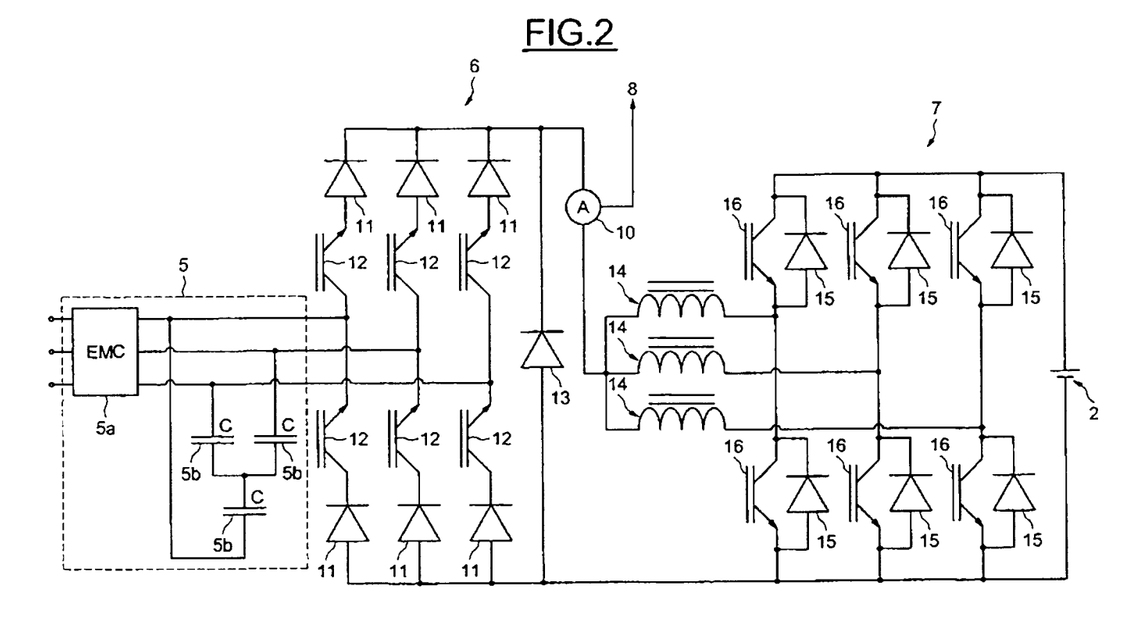
FIG. 2 illustrates one embodiment of a battery charging device.

FIG. 2 shows a detailed representation of an embodiment of a device 1 for charging a battery 2. The device 1 comprises three available phases. The three phases can be coupled to a three-phase power supply network, or a single-phase power supply network. In the latter case, the two available phases are coupled to the phase and the neutral of the single-phase power supply network, and the third available phase is not used.

As can be seen in FIG. 2, the filtering means 5 comprise an electromagnetic compatibility (EMC) filter 5a, and filtering capacitors 5b. The EMC filter 5a is, for example, a filter with inductances and common-mode capacitors making it possible to filter the current pulses generated by the transistors of the input 6 and output 7 stages of the device 1. The filtering means 5 make it possible to filter the current absorbed in this way so that the current satisfies the network connection constraints imposed by the network operators in terms of harmonics, as well as those of the motor vehicle domain.

Instead of a so-called "star" arrangement of the capacitors, it is also possible to have capacitors 5b according to a so-called "delta" arrangement (not presented), that is to say by arranging the capacitors between each phase and the neutral at the output of the EMC filtering means 5a. The current value passing through them is thus reduced.

The rectifier input stage 6 comprises a rectification circuit comprising diodes 11 coupled in series with transistors 12. The rectification circuit comprises three branches coupled in parallel to one another, each of the branches comprising a series assembly comprising in succession a diode 11, two transistors 12 and a diode 11. The two diodes 11 are mounted in the same passing direction. Each branch is also coupled to a phase, the coupling being set up between the two transistors 12.

This rectification circuit is coupled in parallel with at least one free wheeling diode 13.

The rectifier input stage 6 is coupled at the output to a module 10 for measuring the current from the input stage 6, such as an ammeter, in order to regulate this current by controlling the rectifier input stage 6.

The inverter output stage 7 is coupled to the output of the measurement module 10 via three stator coils 14. Each stator coil 14 is coupled at the input to the measurement module 10. Thus, the current from the rectifier input stage 6 is divided into the three branches of a circuit of the inverter output stage 7.

The inverter output stage 7 also comprises, in practice, a circuit comprising three parallel-coupled branches. Each branch comprising a series coupling of two assemblies each comprising a diode 15 and a transistor 16 coupled in parallel. The two diodes 15 of one and the same branch are mounted in the same passing direction.

Each coil 14 is coupled to a branch of the circuit of the inverter output stage 7. The coupling is set up between the two series-coupled assemblies.

The inverter output stage 7 is finally coupled at the output to the battery 2.

Optimizing the device 1 consists in constantly or periodically, for example at a sampling rate of 100 microsecond, adjusting the minimum average output current of the rectifier input stage 6, according to the voltage of the battery rather than leaving this current permanently at its highest value. The efficiency of the rectifier input stage 6 is thus improved by reducing the losses through switching of the transistors 12 which switch a lesser current.

In these conditions, an average voltage at the output of the rectifier input stage 6, in other words at the terminals of the free wheeling diode 13, is obtained that is less than the voltage from the battery 2, at least by the voltage drop of the junction of the upper diodes of the output stage 7. The inverter output stage 7, consisting of the traction inverter, and the stator coils 14 can then be controlled.

More particularly, the average voltage is controlled by the free wheeling phases, that is to say conduction phases, of the free wheeling diode 13, during which the voltage at its terminals is practically zero, to within the voltage drop of the junction of the diode 13. The longer the free wheeling phases, the lower the average voltage is.

It is thus possible to sequentially control each transistor 12 of the rectifier input stage 6 with the free wheeling phases, thanks to the first control means 8 of the input stage. It is therefore possible to directly control the rectifier input stage 6 by adjusting a duty cycle of switching signals for the transistors 12, i.e. an open loop system precalculated during testing could provide a quick response time. Alternatively, the rectifier input stage 6 can be directly controlled by using a regulation loop that tends to reduce the error between the reference parameter and the measured output current of the rectifier input stage 6, that could provide for a precise control but with a slower response time, according to a PI or PID structure for example. As another alternative, the rectifier input stage 6 can be directly controlled by using a regulation loop and by adjusting the duty cycle of the switching signal in a way similar to the regulation described in FIG. 3B but with other parameters that could provide for a precise and quick response time.

It is, for example, possible to optimize the spectrum of the voltage at the terminals of the free wheeling diode 13 by minimizing the level of the power supply network harmonics. This voltage is then better filtered by the stator of the electric vehicle.

It is also possible to lower the number of switchings and therefore the losses generated by the rectifier input stage 6. The lower the number of switchings, the more the losses decrease. On the other hand, the voltage produced in this case contains lower frequency harmonics that will therefore be less filtered by the stator coils.

The first control means 8 of the input stage control the current taken from the three-phase power supply network by duty cycles of the current pulses that are applied to the control electrodes of the transistors 12 of the rectifier input stage 6.

The inverter output stage 7 comprises elements dedicated to the traction of the electric vehicle. In other words, the inverter stage of the traction system in this case constitutes the output stage 7 of the charging device. Thus, the vehicle does not require a second inverter stage between the battery 2 and the traction device.

The function of this output stage 7 is to supply a defined charging current to the battery, which is necessarily less than the average current obtained from the rectifier input stage 6, from the regulated current obtained from the rectifier input stage 6. The charging current is defined based on the power available in the power supply network and on the battery voltage. For example, the upper limit of the charging current can be up to 200 A, with a power supply network that delivers a power of 43 kW and at a battery voltage of 200V when it is discharged.

In order to limit the harmonic spectrum of the currents that circulate in the battery, each branch of the circuit of the inverter output stage 7 can also be controlled by second control means 9 which can be independent of the control means 8 of the input stage. Acceptable harmonic spectrums of the currents should be defined by testing procedures with respect with the battery that is used, in order to provide suitable reliability for the battery. The drive voltage pulse of each branch of the circuit of the inverter output stage 7 is, for example, offset by a third of a period to one another for a circuit using three branches. The range of acceptable offsets depends on the number of branches and thus the offsets are in the range of 0 to a ratio of a period to the number of branches.

Each branch of the circuit of the inverter output stage 7 can be driven individually with a regulation loop that is specific to it, or collectively, that is to say, with the same duty cycle applied to the control of each branch.

FIG. 3A shows an exemplary regulation means 20 included in the first control means 8 of the rectifier input stage 6.

The regulation means 20 receive at the input the current $I_{DC}$ output from the rectifier input stage 6, measured by the measurement module 10. Comparison means 21 then determine the difference between the duly measured current $I_{DC}$ output from the input stage 6 and a reference current value $I_{DC\_ref}$ to which it is desired to adjust the current $I_{DC}$. The comparisons means 21 can comprise a digital calculator suitable for subtracting two values of current, or alternatively comprise analog circuits such as subtractors.

The value of the reference current $I_{DC\_ref}$ can be a constant value that is equal to (or not more than 10% higher than) the maximum value between the ratio of the power charged into the battery divided by the minimum battery voltage when the battery is in a discharge state and the peak pulse current of the power supply network. Alternatively, the value of the reference current $I_{DC\_ref}$ can be modified according to the battery voltage that is proportional to the battery current times the battery voltage divided by the average voltage at the terminals of the free wheeling diode 13 (to have a robust design, Idc_ref can be increased to about 115% of the calculated value). Therefore, $I_{DC\_ref}$ is decreasing as the battery current decreases, because of constant input power that results in the ratio of the battery voltage Vbatt divided by the average voltage at the terminals of the free wheeling diode 13 being substantially constant.

The difference calculated in this way by the comparison means 21 is delivered to a regulation module 22 (for example, a PID controller) which then applies a correction, such as a correction of proportional, integral type which makes it possible to deliver to the output the desired amplitude of the current from the power supply network, reflecting the power of the power supply network.

The current amplitude duly delivered by the regulation module 22 is multiplied by the computation means 23, acting as an electronic multiplier circuit, with the voltage of the power supply network previously synchronized and normalised by synchronization means 24. The output of the synchronisation means 24 is the voltage signal waveform (defined mainly by its frequency and phase) which amplitude is normalised within a constant range. Thus, the output of the regulation means 22 giving the current amplitude, is transformed at the output of the computation means 23 into the reference current which waveform is adapted to the waveform of the power supply network current signal.

A suitable synchronisation means 24 can be a PLL (Phase Locked Loop) circuit.

The computation means 23 then deliver as output a current setpoint (for example 16, 32, 63 amp) for the power supply network to control means 25 able to generate a control strategy for the transistors 12 of the rectifier input stage 6. A suitable control means 25 could comprise a current space vector. Such a current space vector is an adaptation of a voltage space vector commonly used in inverters, but instead of having dead times between switchings as in the voltage space vector, having overlap periods at the moment of switching.

Figure 3B:
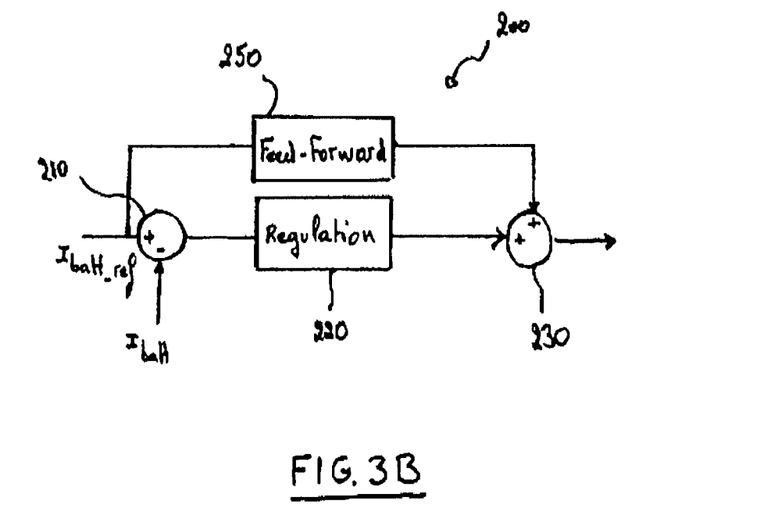
FIG. 3B presents an exemplary regulation means.

FIG. 3B shows an exemplary regulation means 200 that can be in the second control means 9 of the rectifier output stage 7.

The regulation means 200 receive at its input a reference input battery current $I_{batt\_ref}$. The reference battery $I_{batt\_ref}$ current is the current that the battery desires. $I_{batt\_ref}$ is calculated and given by the battery calculator on the basis of various internal parameters of the battery for example the aging, temperature, balancing among the cells, chemical composition of the electrodes etc. . . . Comparison means 210 then determines the difference between the duly measured input battery current $I_{batt}$ that is measured at the input terminal of the battery 2 by an ammeter and a reference input battery current value $I_{batt\_ref}$ to which it is desired to adjust the input battery current $I_{batt}$. The comparisons means 210 can comprise a digital calculator suitable for subtracting two values of current, or alternatively comprise analog circuits such as subtractors.

The difference calculated in this way by the comparison means 210 is delivered to a regulation module 220 which then applies a correction, such as a correction of proportional, integral type.

In parallel, the feed forward means 250, for example a calculator adapted to multiply a signal by a constant value, receive at its input the reference input battery current value $I_{batt\_ref}$. The feed forward means 250 then calculates an open loop control value which represents the main part of the control value. The control value is obtained from the ratio between the battery reference current divided by the current measured by the measurement module 10. It generally represents at least 90% of the control value.

The final control value is then realized by adding the feed forward means 250 output to the regulation module 220 output. The adder function means 230 can comprise a digital calculator suitable for adding two values, or alternatively comprise analog circuits such as adder circuits.

Figure 4:
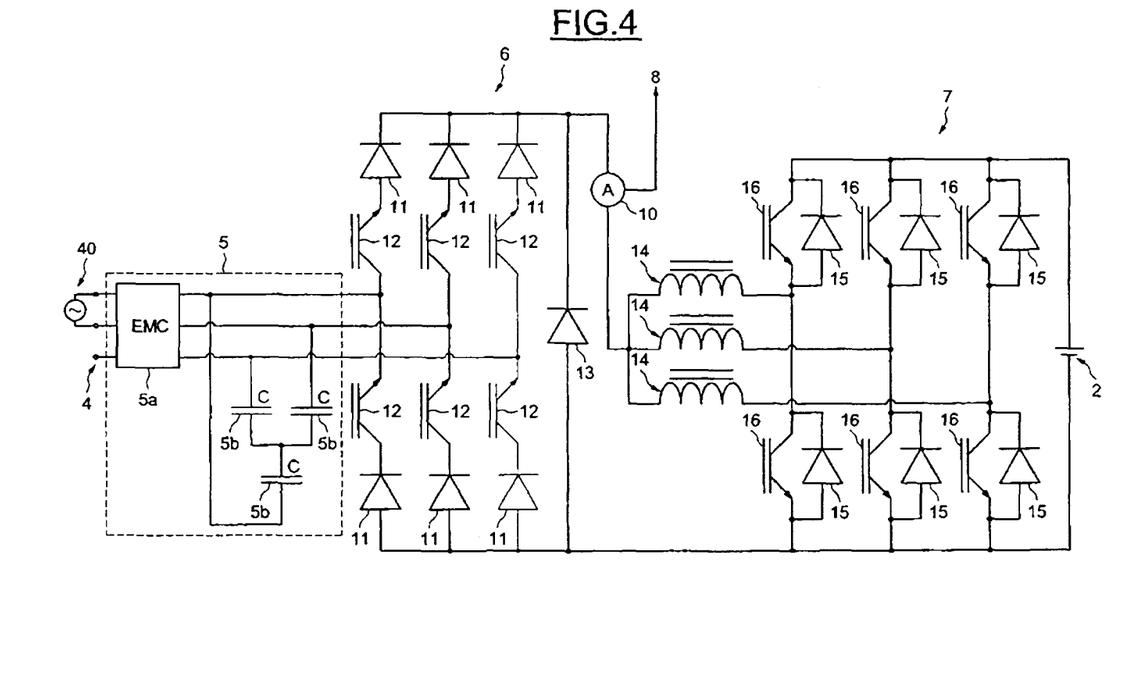
FIG. 4 diagrammatically represents a charging device for a battery powered by a single-phase power supply network.

FIG. 4 shows a device 1 for charging a battery 2 powered by a single-phase power supply network 40. In this figure, those elements that are the same as those described previously are given the same numeric reference.

The operating principle remains the same as that of the device 1 powered by a three-phase power supply network for the inverter output stage 7. The input stage, on the other hand, has only four transistors 12 which switch so as to provide a sinusoidal absorption of the input current. The charging device is independent of the voltage level and frequency of the three-phase power supply network, and can adapt for example to a 400V/50 Hz European power supply network, or to a 200V/50 Hz or 200V/60 Hz Japanese power supply network, or to the 208V/60 Hz US power supply network.

Figure 5:
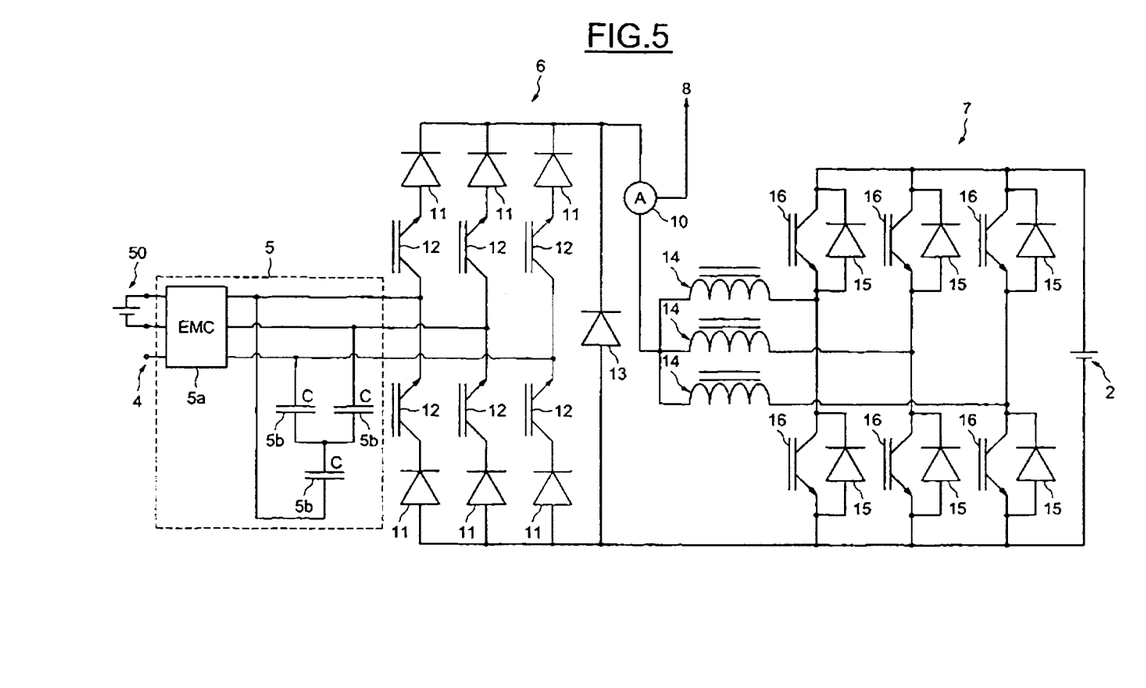
FIG. 5 diagrammatically represents a battery charging device powered by a DC voltage.

FIG. 5 shows a device 1 for charging a battery 2 powered by a DC voltage 50. In this figure, those elements that are the same as those described previously are given the same numeric reference.

The inverter output stage 7 retains the same control principle as the output stage of the device of FIG. 4. It therefore mainly involves, in this embodiment, applying a DC voltage to the input of the device instead of the single-phase power supply.

The profile remains continuous while the amplitude remains the parameter deriving from the regulation. The charging device is independent of the voltage level of the DC power supply network.

Figure 6:
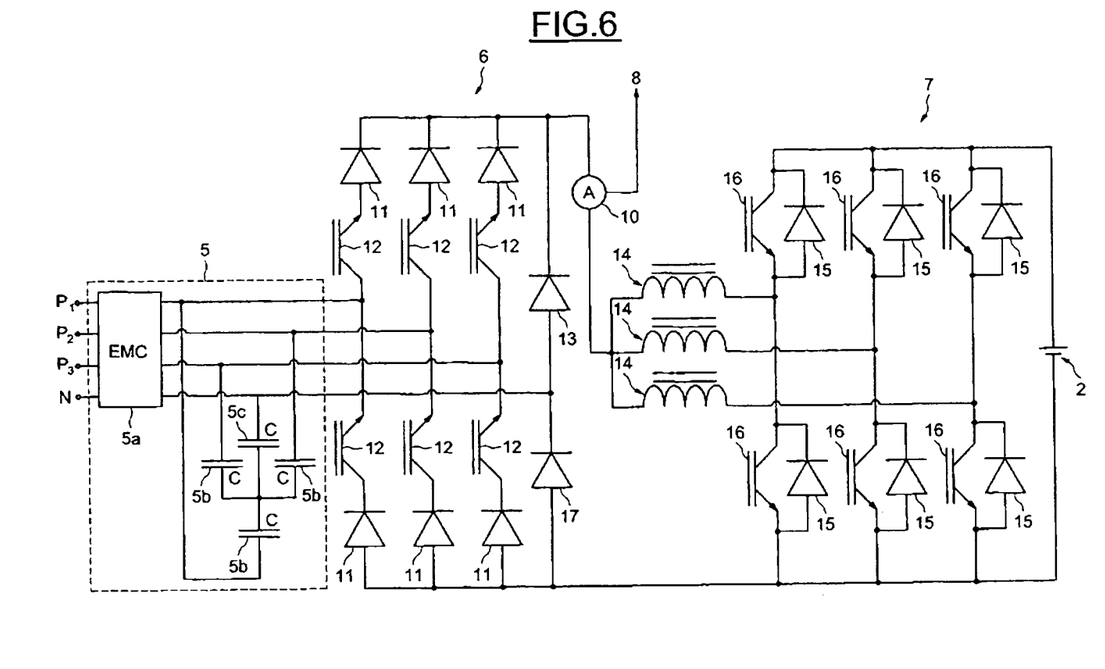
FIG. 6 represents another implementation of a battery charging device.

FIG. 6, in which those elements that are identical to those of FIGS. 2 to 5 are given the same references, shows another embodiment of a device 1 for charging a battery 2.

In this embodiment, the three phases are denoted $P_1$, $P_2$ and $P_3$ and the neutral is denoted N. A coupling is added for the neutral wire N of the three-phase power supply network. In this case, a second free wheeling diode 17 is added to the rectifier input stage 6, as well as a capacitor 5c for filtering the neutral arranged between the wire of the neutral N and the common point C of the filtering capacitors 5b. The latter capacitor 5c makes it possible to provide filtering between the neutral wire and the phases. This second free wheeling diode 17 is coupled in series before the first free wheeling diode 13 in the passing direction. The neutral wire is coupled to the branch duly formed by the two free wheeling diodes 13 and 17 connected in series, the coupling being provided between the two free wheeling diodes 13 and 17.

As an alternative, the filtering capacitors 5b can be mounted in a so-called "delta" arrangement as explained in relation to the embodiment detailed in FIG. 2. There is then no need to provide the neutral filtering capacitor 5c.

It is also possible to use the charging device 1 produced according to this embodiment with a single-phase power supply network by coupling the neutral wire of the single-phase power supply network to the dedicated input coupled to the branch comprising the two free wheeling diodes 13 and 17.

Figure 7:
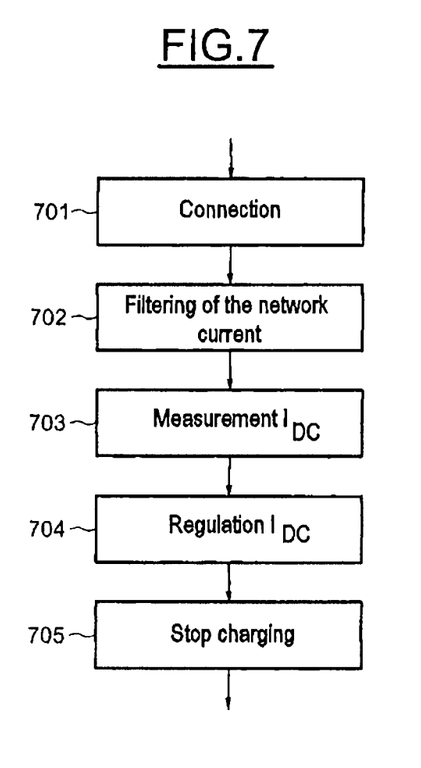
FIG. 7 presents a flow diagram of a method of charging a battery, according to one implementation.

The charging device is independent of the voltage level and frequency of the single-phase power supply network, and can adapt for example to a 230V/50 Hz European power supply network, or to a 100V/50 Hz or 100V/60 Hz Japanese power supply network, or to the 120V/60 Hz US power supply network FIG. 7 shows a flow diagram of a method of charging a battery of an electric vehicle.

In a first step 701, the rectifier input stage 6 of the device 1 for charging a battery 2 is connected to a power supply network 3 via filtering means 5 and connection means 4. No contactor is needed for the connection.

In a next step 702, the current from the power supply network absorbed using filtering means 5 comprising an EMC filter 5a and capacitors 5b is filtered so that the current satisfies the harmonics mask of the power supply network connection constraints.

In a next step 703, the current $I_{DC}$ at the output of the rectifier input stage 6 is measured. From this measurement, in a next step 704, the current $I_{DC}$ output from the input stage is regulated by controlling the transistors 12 of the input stage 6.

Finally, in a step 705, the charging of the battery 2 of the electric vehicle is stopped once the charge voltage of the battery 2 is at its maximum.

The charging device 1 thus described makes it possible to overcome the constraint that requires the voltage of the battery to be permanently greater than the maximum voltage of the power supply network.

It also makes it possible to use only the inductance of the stator coils 14 of the charging device 1 as energy buffer filter. In practice, when the charging power is high, the footprint and the weight of such an inductive and/or capacitive filter would become prohibitive to be mounted on board a motor vehicle.

It also offers the possibility of enabling the device to operate in charging mode or in traction mode without having to use contactors to switch between operating modes.

Lastly, it allows for a faster charging of the battery 2.

The invention claimed is:

1. A device for charging a battery comprising:
a rectifier input stage connectable to a power supply network;
an inverter output stage connectable to the battery; and
processing circuitry that regulates average current obtained from an output of the rectifier input stage to a current value calculated according to a maximum current supplied by the power supply network and according to a coefficient that is greater than or equal to a ratio between a maximum voltage rectified by the rectifier input stage to a voltage of the battery.

2. A device according to claim 1, further comprising:
connection circuitry that connects the rectifier input stage to one or more of a three-phase power supply network and a single-phase power supply network.

3. A device according to claim 1, wherein the rectifier input stage includes at least one free-wheeling diode.

4. A device according to claim 1, further comprising:
first control circuitry that controls the rectifier input stage; and
second control circuitry that controls the inverter output stage to control an output of the rectifier input stage,
wherein the first control circuitry is independent of the second control circuitry.

5. A device according to claim 4, wherein the first control circuitry includes a circuitry portion that controls a duty cycle of a switching control signal for one of the rectifier input stage and a regulation loop.

6. A device according to claim 1,
wherein the device is mountable in a motor vehicle with an electric traction system, and
wherein the inverter output stage is formed by an inverter stage of the electric traction system of the motor vehicle.

7. A device according to claim 1, further comprising filtering circuitry, incorporated in a motor vehicle, that filters current from the power supply network.

8. A battery charging method, comprising:
regulating average current obtained from an output of a rectifier input stage to a current value generated from a maximum current supplied by a power supply network connected to the rectifier input stage according to a coefficient that is greater than or equal to a ratio between a maximum voltage rectified by the rectifier input stage and a voltage of the battery.

9. A method according to claim 8, wherein the input rectifier stage is connectable to one or more of a three-phase power supply network and a single-phase power supply network.

10. A method according to claim 8, further comprising circulating current from an inverter output stage in at least one free-wheeling diode.

11. A method according to claim 8, wherein the rectifier input stage is controlled by control of a duty cycle of a switching control signal for one of the rectifier input stage and by a regulation loop, the control of the rectifier input stage being independent of control of an inverter output stage.

12. A method according to claim 8, further comprising filtering current from the power supply network using a filter incorporated in a vehicle.

13. A device according to claim 1, wherein the rectifier input stage is connectable directly to the power supply network, without a contactor therebetween.

14. A method according to claim 8, further comprising connecting the power supply network directly to the rectifier input stage, without a contactor therebetween.

* * * * *